United States Patent
Park et al.

(10) Patent No.: US 10,218,205 B2
(45) Date of Patent: Feb. 26, 2019

(54) WIRELESS POWER TRANSMISSION/RECEPTION DEVICE

(71) Applicant: Samsung Electronics Co., Ltd., Gyeonggi-do (KR)

(72) Inventors: Jae-Hyun Park, Gyeonggi-do (KR); Young-Ho Ryu, Gyeonggi-do (KR); Kyu-Sub Kwak, Seoul (KR); Sang-Wook Kwon, Gyeonggi-do (KR); Do-Won Kim, Gyeonggi-do (KR); Dong-Zo Kim, Gyeonggi-do (KR); Keum-Su Song, Seoul (KR); Chi-Hyung Ahn, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 364 days.

(21) Appl. No.: 14/870,775

(22) Filed: Sep. 30, 2015

(65) Prior Publication Data
US 2016/0099577 A1 Apr. 7, 2016

(30) Foreign Application Priority Data
Oct. 7, 2014 (KR) .................. 10-2014-0135038

(51) Int. Cl.
*H01F 27/42* (2006.01)
*H01F 37/00* (2006.01)
(Continued)

(52) U.S. Cl.
CPC ............ *H02J 7/025* (2013.01); *H02J 17/00* (2013.01); *H02J 50/12* (2016.02); *H02J 50/80* (2016.02)

(58) Field of Classification Search
CPC ........... H02J 17/00; H03H 7/40; H01Q 1/007; H01F 37/00
(Continued)

(56) References Cited

U.S. PATENT DOCUMENTS 6,184,758 B1* 2/2001 Ishikawa ............ H01P 1/20318
333/134
9,318,922 B2* 4/2016 Hall ........................ B60L 1/00
(Continued)

FOREIGN PATENT DOCUMENTS

CN 103124107 5/2013
CN 103339824 10/2013
(Continued)

OTHER PUBLICATIONS

International Search Report dated Dec. 21, 2015 issued in counterpart application No. PCT/KR2015/009503, 7 pages.
(Continued)

*Primary Examiner* — Fritz M Fleming
*Assistant Examiner* — Jagdeep Dhillon
(74) *Attorney, Agent, or Firm* — The Farrell Law Firm, P.C.

(57) ABSTRACT

Apparatuses, systems, and methods of wireless power transmission/reception are described. In one wireless power transmission/reception device, a planar resonator capable of generating magnetic fields has one or more ferrite members mounted thereon such that the magnetic fields generated by the planar resonator have an overall direction substantially tilted or parallel to its opening/face, i.e., to the plane of the planar resonator. In a wireless power reception device, the planar resonator generates magnetic fields and an induced current when being resonated by external magnetic fields; in a wireless power transmission device, the planar resonator generates magnetic fields when being supplied with power.

22 Claims, 12 Drawing Sheets

(51) Int. Cl.
  *H01F 38/00* (2006.01)
  *H02J 7/02* (2016.01)
  *H02J 17/00* (2006.01)
  *H02J 50/12* (2016.01)
  *H02J 50/80* (2016.01)

(58) Field of Classification Search
  USPC ....... 307/43, 104, 149, 82; 315/70; 343/788, 343/786
  See application file for complete search history.

(56) References Cited

U.S. PATENT DOCUMENTS

| | | | |
|---|---|---|---|
| 2008/0084211 A1* | 4/2008 | Freytag | G01R 33/307 324/322 |
| 2010/0156570 A1 | 6/2010 | Hong et al. | |
| 2010/0244582 A1 | 9/2010 | Yoshikawa | |
| 2011/0316334 A1 | 12/2011 | Shimokawa | |
| 2012/0120636 A1* | 5/2012 | Wilt | F21V 21/084 362/105 |
| 2012/0187904 A1 | 7/2012 | Tabata et al. | |
| 2012/0193996 A1 | 8/2012 | Ryu et al. | |
| 2012/0223586 A1 | 9/2012 | Gotani | |
| 2012/0235567 A1* | 9/2012 | Karalis | H03H 7/40 315/70 |
| 2012/0286584 A1 | 11/2012 | Park et al. | |
| 2013/0007949 A1* | 1/2013 | Kurs | A42B 3/0406 2/410 |
| 2013/0038498 A1* | 2/2013 | Ferrer-Herrera | H01Q 1/007 343/788 |
| 2013/0127258 A1 | 5/2013 | Moh | |
| 2013/0221744 A1* | 8/2013 | Hall | H02J 17/00 307/9.1 |
| 2014/0028109 A1 | 1/2014 | Simon et al. | |
| 2014/0049211 A1 | 2/2014 | Park et al. | |
| 2014/0060505 A1 | 3/2014 | Khan et al. | |
| 2014/0091636 A1 | 4/2014 | Ofstein et al. | |
| 2014/0184155 A1 | 7/2014 | Cha | |
| 2014/0225449 A1* | 8/2014 | Kurs | H01F 37/00 307/104 |
| 2014/0292264 A1 | 10/2014 | Boys et al. | |
| 2014/0361627 A1* | 12/2014 | Kurs | H02J 17/00 307/104 |

FOREIGN PATENT DOCUMENTS

| | | |
|---|---|---|
| CN | 203366973 | 12/2013 |
| CN | 103683525 | 3/2014 |
| EP | 2 418 729 | 2/2012 |
| EP | 2 749 445 | 7/2014 |
| KR | 101197579 | 11/2012 |
| WO | WO 2013/122483 | 8/2013 |
| WO | WO 2014/011059 | 1/2014 |
| WO | WO 2014/118615 | 8/2014 |
| WO | WO 2014/122121 | 8/2014 |

OTHER PUBLICATIONS

European Search Report dated May 18, 2018 issued in counterpart application No. 15848375.0-1202, 7 pages.
Chinese Office Action dated Sep. 30, 2018 issued in counterpart application No. 201580053549.X, 14 pages.
European Search Report dated Jan. 2, 2019 issued in counterpart application No. 15848375.0-1202, 4 pages.

* cited by examiner

WIRELESS POWER TRANSMISSION/RECEPTION DEVICE

PRIORITY

This application claims priority under 35 U.S.C. § 119(a) to Korean Application Serial No. 10-2014-0135038, which was filed in the Korean Intellectual Property Office on Oct. 7, 2014, the entire content of which is incorporated herein by reference.

BACKGROUND

1. Field of the Disclosure

The present disclosure relates generally to a power transmission/reception system, and more particularly to wireless power transmission and reception devices.

2. Description of the Related Art

Due to the advancements in information and communication technology, more varied types of electronic devices are utilized by individual users in daily life. For example, an individual user may own a mobile communication terminal, a tablet PC, an electronic scheduler, and a portable multimedia player, of which the individual user may select and use one or more according to the intended purpose and/or environment. Electronic devices are usually supplied with power via a wire, and the portable electronic devices may also have a battery pack embedded therein so that the portable electronic device may be used for a given period of time when no power is supplied via a wire.

However, periodic charging and/or replacement of such battery packs is usually required. Accordingly, many portable electronic devices are provided with a charging device and/or a suitable charging cable. As many individual users may own more than one portable device, the individual user may have multiple charging devices and/or charging cables, one for each of the portable electronic devices owned by the user. As the number of portable electronic devices owned by the individual user increases, the burden on the user to own the number of corresponding charging accessories also increases. Furthermore, it is inconvenient for the user to carry the ever-increasing number of charging accessories.

It is expected that the user's burden or inconvenience will be alleviated by the use of wireless power transmission/reception since a plurality of different electronic devices may be charged using a single wireless charging device. However, in order to enable charging by wireless power transmission/reception, it will be necessary to ensure a stable power transmission/reception performance. For example, wireless power transmission/reception at a distance should be sufficiently enabled, and sufficient power transmission/reception efficiency should be ensured within a predetermined distance range.

However, in a wireless power transmission/reception system, the wireless power transmission/reception efficiency may vary greatly depending on the relative alignment between the transmission side (primary) resonator and the one or more reception side (secondary) resonators. For example, when the distribution of magnetic fields (H-fields) formed by the primary resonator and the distribution of magnetic fields formed by the secondary resonator(s) are in parallel, the wireless power transmission/reception is considerably efficient within a predetermined distance range. However, when the distribution of magnetic fields formed by the primary resonator and the distribution of magnetic fields formed by the secondary resonator are perpendicular to each other, the wireless power transmission/reception efficiency may be sharply degraded even at a sufficiently close distance.

SUMMARY

The present disclosure addresses at least the issues described above and provides at least the advantages described below. According to one aspect of the present disclosure, a wireless power transmission/reception system is provided which is capable of transmitting/receiving power in a wireless manner using electromagnetic field coupling between a primary resonator in a transmission side device and a secondary resonator in a reception side device (or in each of a plurality of reception side devices).

According to another aspect of the present disclosure, a wireless power transmission/reception system is provided which is capable of stably securing a power transmission/reception efficiency when the primary and secondary resonators are positioned within a predetermined distance.

According to an aspect of the present disclosure, a wireless power reception device is provided, including a planar resonator which has an opening/face, and is capable of generating magnetic fields and an induced current when being resonated by external magnetic fields; and one or more ferrite members mounted on the planar resonator such that the magnetic fields generated by the planar resonator have an overall direction substantially tilted or parallel to the opening/face.

According to another aspect of the present disclosure, a wireless power transmission device is provided, including a planar resonator which has an opening/face, and which is capable of generating magnetic fields when being supplied with power; and one or more ferrite members mounted on the planar resonator such that the magnetic fields generated by the planar resonator have an overall direction substantially tilted or parallel to the opening/face.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
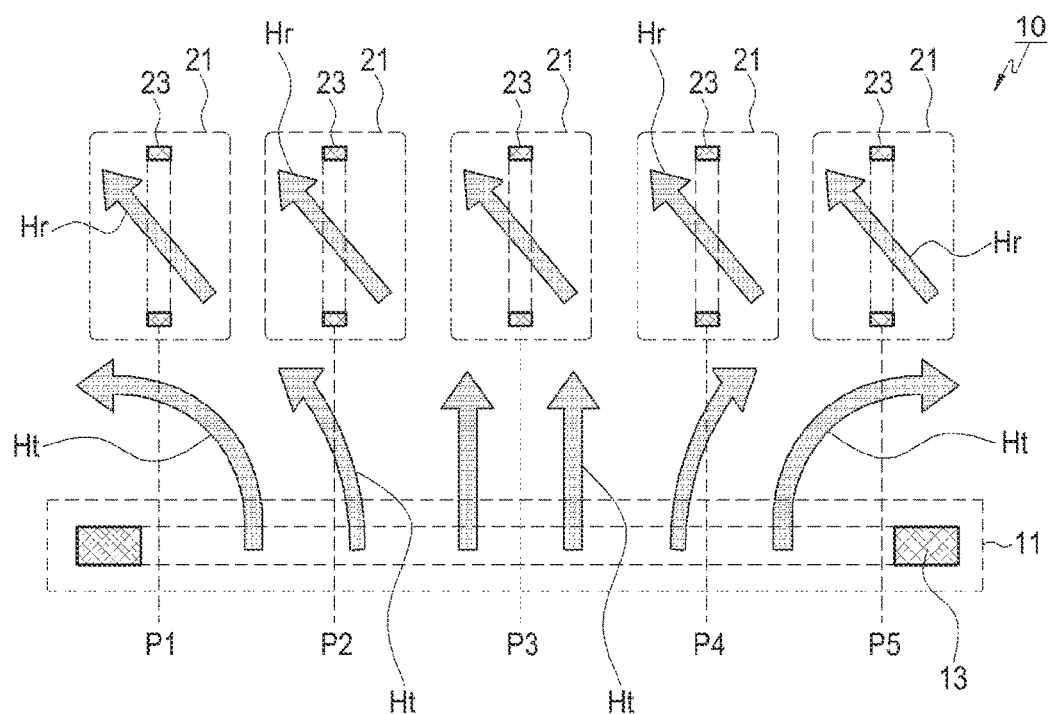
FIG. 1 is a diagram illustrating a wireless power transmission/reception system according to an embodiment of the present disclosure.

As the present disclosure allows for various changes and numerous embodiments, some examples/embodiments will be described in detail with reference to the accompanying drawings. However, it should be understood that the present disclosure is not limited to any of the specific examples/embodiments, but rather includes all possible modifications, equivalents, and alternatives within the spirit and the scope of the present disclosure, as would be understood by one of ordinary skill in the art.

Although ordinal terms such as "first" and "second" may be used to describe various elements, the terms are used merely to distinguish one element from the other elements, and the elements themselves are not limited by these terms. For example, a first element may be referred to as a second element, and similarly, a second element may be referred to as a first element, without departing from the scope of the present disclosure. As used herein, the term "and/or" includes any and all combinations of the listed items.

Further, relative terms such as "a front surface", "a rear surface", "a top surface", "a bottom surface", and the like which are described with respect to the orientation in the drawings may be replaced by ordinal numbers such as first and second.

Many of the terms used in this application are for the purpose of description only and are not intended to limit the disclosure. for example. as used herein, the singular form of words are intended to include the plural forms as well, unless the context clearly indicates otherwise. In the description, it should be understood that the terms "include" or "have" indicate the existence of at least one other possible feature, number, step, operation, structural element, part, or combination thereof, and should not be interpreted to exclude any such possibilities.

Unless the context clearly indicates otherwise, all terms used herein, which include technical terminologies or scientific terminologies, have the same meaning as that understood by a person of ordinary skill in the art. Such terms are to be interpreted to have the meaning at least equal in scope and variety to the contextual meanings used by those of ordinary skill in the field of art, and are not to be interpreted to have ideal or excessively formal meanings unless clearly defined so in the present specification.

In the present disclosure, an electronic device may be any arbitrary electronic device, such as, for example, a terminal, a portable terminal, a mobile terminal, a communication terminal, a portable communication terminal, a portable mobile terminal, a display device or the like. As other examples, the electronic device may be a smartphone, a portable phone, a game player, a TV, a display unit, a heads-up display unit for a vehicle, a notebook computer, a laptop computer, a tablet Personal Computer (PC), a Personal Media Player (PMP), a Personal Digital Assistants (PDA), and the like. The electronic device may be implemented as a portable communication terminal which has a wireless communication function and a pocket size. Further, the electronic device may be a flexible device or a flexible display device.

The electronic device may communicate with an external electronic device, such as a server or the like, through a network or the like, or perform operations by interworking with an external electronic device. For example, the electronic device may transmit an image photographed by a camera and/or position information detected by a sensor unit to a server through a network. The network may be a mobile or cellular communication network, a Local Area Network (LAN), a Wireless Local Area Network (WLAN), a Wide Area Network (WAN), an Internet, a Small Area Network (SAN) or the like, but is not limited thereto.

According to various embodiments of the present disclosure, a wireless power transmission/reception system includes a wireless power transmission device having a primary (transmitting) planar resonator and one or more wireless power reception devices, each having a secondary (receiving) planar resonator. The primary and secondary planar resonators form an electromagnetic field coupling, in which magnetic fields are generated with an overall direction tilted or parallel to the plane of the secondary planar resonator(s). Ferrite members may be used to cause the generated magnetic fields to be tilted or parallel in relation to the plane of the secondary planar resonator(s).

For example, when a reception side electronic device (e.g., a mobile communication terminal) is cradled or mounted on a transmission side device (e.g., a charging cradle) according to various embodiments of the present disclosure, the magnetic field distribution generated by the transmission side planar resonator and the reception side planar resonator has an overall direction substantially tilted or parallel to the plane of the reception side planar resonator. Accordingly, in arranging the reception side (or transmission side) planar resonator in accordance with the present disclosure, ferrite members may be mounted in consideration of the relative direction/orientation of the receiving and transmitting electronic devices, and a stable wireless power transmission/reception efficiency can be secured.

In one embodiment, at least one ferrite member is mounted on one side of the planar resonator and at least one other ferrite member is mounted on the other side of the planar resonator, and the at least one ferrite member and the at least one other ferrite member are staggered in relation to each other on the planar resonator.

In another embodiment, a first ferrite member is disposed adjacent to one end of one side of the planar resonator, a second ferrite member is disposed adjacent to the opposite end of the one side of the planar resonator, and a third ferrite member is disposed on a central region of the opposite side of the planar resonator.

In still another embodiment, the planar resonator comprises at least one of a loop antenna and an LC resonance circuit.

In still another embodiment, the planar resonator is one of a plurality of planar resonators which are arranged in series or parallel to each other.

In describing wireless power transmission/reception systems according to the various embodiments, in the drawings, similar components, which are the same as those of the preceding embodiment or may be easily understood through the preceding embodiment, are denoted by the same reference numerals and the detailed descriptions thereof may be omitted.

Figure 2:
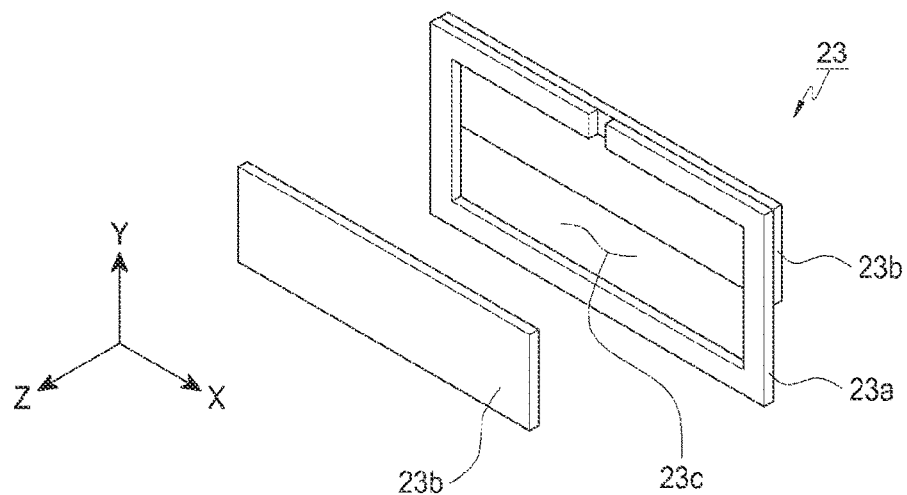
FIG. 2 is a view illustrating a part of a reception device of the wireless power transmission/reception system according to an embodiment of the present disclosure.
Figure 3:
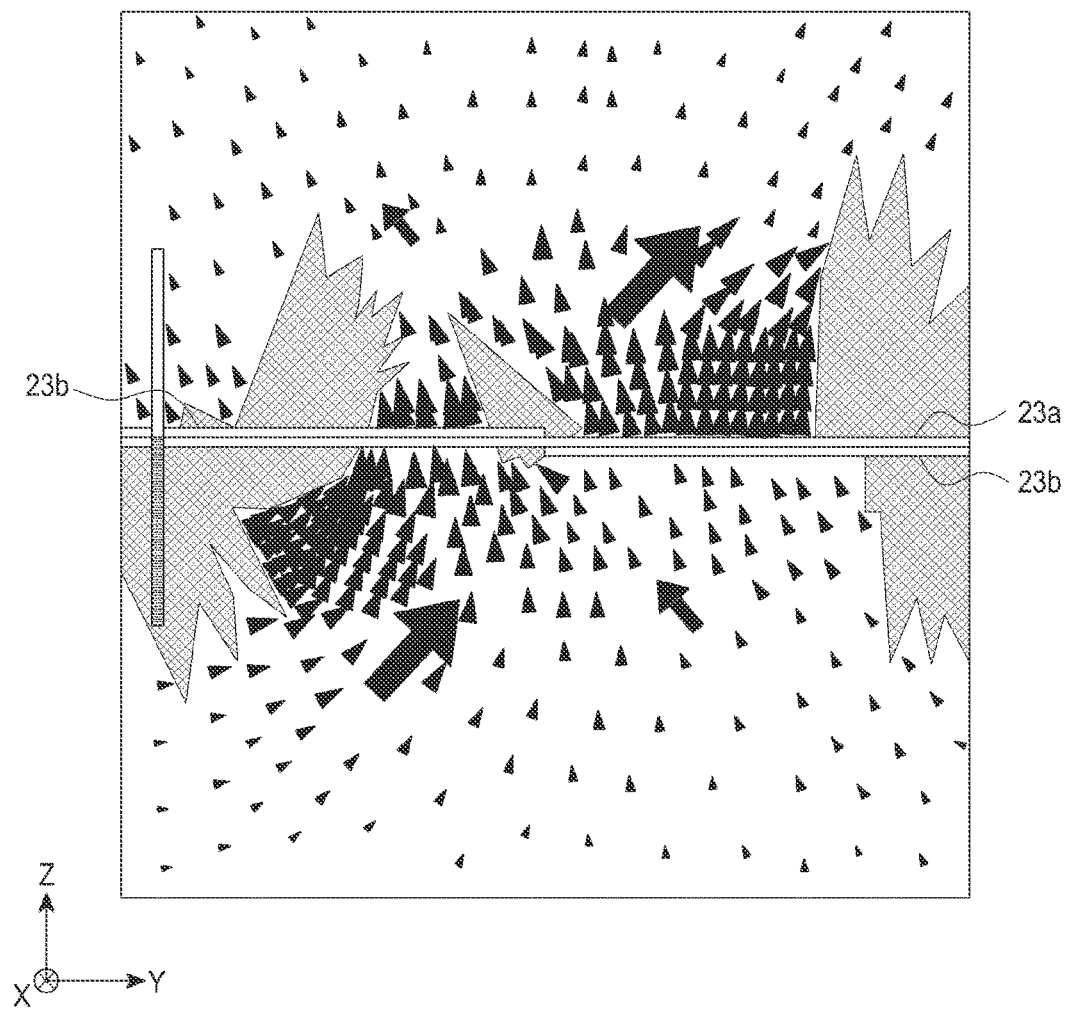
FIG. 3 is a view illustrating a magnetic field (H-field) distribution formed by the reception resonator module 23 of FIG. 2 in a wireless power transmission/reception system according to an embodiment of the present disclosure.

FIG. 1 is a diagram illustrating a wireless power transmission/reception system according to one of various embodiments of the present disclosure. FIG. 2 is a view illustrating a part of a reception device of the wireless power transmission/reception system according to one of various embodiments of the present disclosure. FIG. 3 is a view illustrating a magnetic field (H-field) distribution formed by the reception resonator module 23 of FIG. 2 in a wireless power transmission/reception system according to one of various embodiments of the present disclosure.

Referring to FIGS. 1 and 2, according to one of various embodiments of the present disclosure, a wireless power transmission/reception system 10 forms magnetic fields inclined with respect to an opening face of a planar resonator by arranging a ferrite member on one of planar resonators of a wireless power transmission device/unit 11 and one or more wireless power reception devices/units 21. FIGS. 1 and 2 provide an example of a configuration in which the ferrite member is mounted on the planar resonator of the reception unit side.

In general, a planar resonator forms magnetic fields distributed in a vertical direction in relation to its opening face. When the transmission unit and the reception unit in a wireless power transmission/reception system are configured as planar resonators, efficiency can be ensured by arranging the transmission side planar resonator (i.e., the primary planar resonator) and the reception side planar resonator (i.e., the secondary planar resonator) to face each other (i.e., such that the planes of the respective planar resonators are parallel). However, this depends on, among other things, the design and shape of the reception unit (e.g., a portable electronic device) where the secondary planar resonator is disposed. For example, the secondary planar resonator may be disposed vertically in relation to the primary planar resonator (as is the case in FIG. 1). In such a case, the wireless power transmission/reception efficiency may be sharply degraded.

The wireless power transmission unit 11 includes a primary planar resonator 13 to transmit power wirelessly, and may be formed as a charging cradle, for example. Depending on the size of the transmission unit 11, the size of the primary planar resonator 13, and the size of the reception unit (e.g., the electronic device) 21 adapted to receive the power transmitted from the transmission unit 11, the transmission unit 11 may wirelessly transmit power to a plurality of reception units 21 at the same time. The primary planar resonator 13 may be implemented by a loop antenna structure or an LC resonance circuit, and may include lumped elements (e.g., resistive element(s), inductive element(s) and/or capacitive element(s)) for impedance matching. The magnetic field distribution (Ht) formed by the transmitting/primary planar resonator 13 may be formed in an outwardly tilted direction as approaching an edge while the magnetic field distribution (Ht) formed from a central portion may be formed in a substantially vertical direction in relation to the opening face.

The reception device/unit 21 includes a secondary resonator module 23 so as to receive the power transmitted from the transmission unit 11, and may be implemented as, for example, any one of various portable electronic devices equipped with a chargeable battery pack. The reception device/unit 21 may be, for example, a mobile communication terminal, a tablet PC, a wearable electronic device, or an electronic scheduler. In addition, another electronic device equipped with a chargeable battery pack may be implemented as a reception unit of the wireless power transmission/reception device according to various embodiments of the present disclosure. In FIG. 1, the reception devices/units 21 are disposed such that their secondary planar resonators 23a (shown in FIG. 2) within their secondary resonator modules 23 are disposed in a vertical direction with respect to the primary planar resonator 13.

The secondary planar resonator may be implemented by a loop antenna or an LC resonance circuit, and may include lumped elements (e.g., resistive element(s), inductive element(s) and/or capacitive element(s)) for impedance matching. Depending on the embodiment, as long as the secondary planar resonator is capable of forming an electromagnetic field coupling with the primary planar resonator in accordance with the spirit and scope of the present disclosure, the secondary planar resonator may be implemented using any type of antenna or resonance circuit. In the embodiment shown in FIG. 2, members having a high magnetic permeability, specifically, ferrite members 23b, are arranged on opposite surfaces of the secondary planar resonator 23a to form one resonator module 23. In the arrangement shown in FIG. 2, one ferrite member 23b is attached to one side/face of the secondary planar resonator 23a and another ferrite member is attached to the other side/face of the secondary planar resonator 23a. In the example shown in FIG. 2, the ferrite members 23b attached to opposite sides of the secondary planar resonator 23a are staggered in relation to each other. By arranging the ferrite members 23b in this way, the overall magnetic field distribution (Hr) formed by the secondary resonator module 23 is tilted in relation to the opening face 23c of secondary planar resonator 23a. While the ferrite members 23b in FIG. 2 have substantially equal sizes and shapes and are attached in staggered relation to the opposite surfaces of the secondary planar resonator 23a, the shapes, sizes, points of attachment, relative positions, and number of ferrite members may be varied in consideration of, for example, the external appearance/construction/usage/ etc. of reception device/unit 21 and the cradling/charging position/orientation provided by the transmission device/unit 11.

FIG. 3 is a view illustrating a magnetic field (H-field) distribution formed by a reception resonator module of a wireless power transmission/reception system according to one of various embodiments of the present disclosure.

It can be seen that the magnetic fields formed by the secondary planar resonator 23a are substantially distributed by the ferrite members 23b along the direction from the lower left to the upper right of FIG. 3 and relatively weakly distributed along the direction from the lower right to the upper left of FIG. 3. Consequently, in FIG. 3, the secondary planar resonator 23a has a magnetic field distribution tilted with respect to its opening/face 23c, i.e., a magnetic field distribution directed from the lower left to the upper right, such that a magnetic field distribution may have a horizontal vector component with respect to the opening face 23c and a vertical vector component with respect to the opening face 23c. Accordingly, as long as the reception device/unit 21 is disposed close enough to the transmission unit 11 for charging, a sufficient wireless power transmission/reception efficiency is ensured even if the secondary planar resonator 23a is disposed vertically in relation to the primary planar resonator 13 due to the relative positions/orientations of the reception device/unit 21 and transmission device/unit 11.

Figure 4:
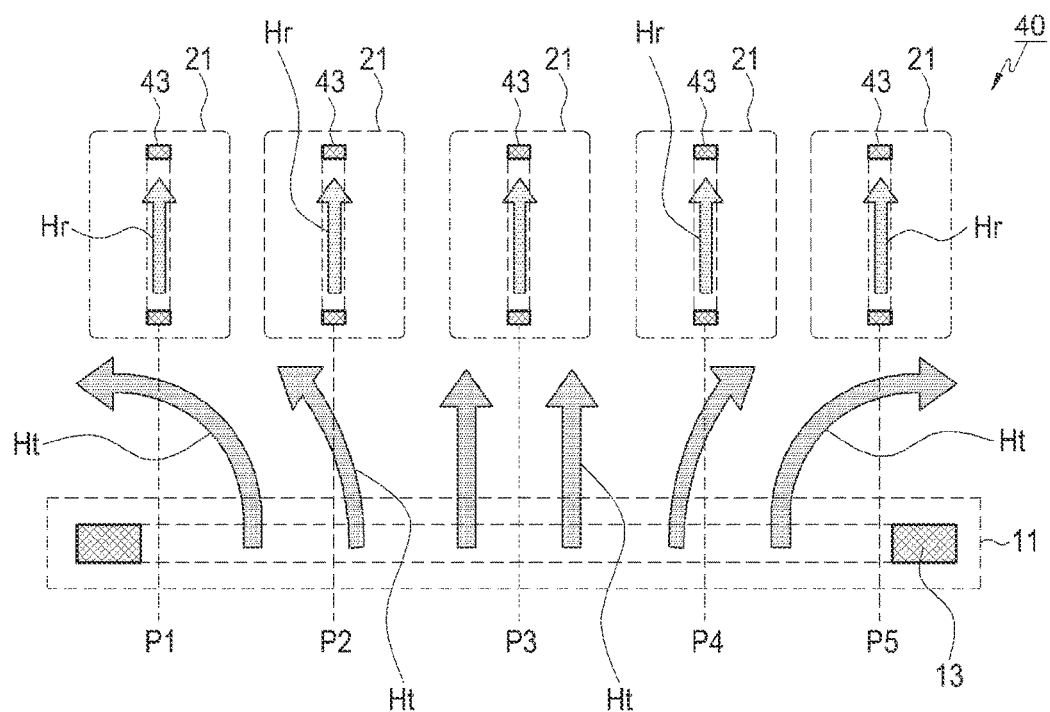
FIG. 4 is a diagram illustrating a wireless power transmission/reception system according to an embodiment of the present disclosure.
Figure 5:
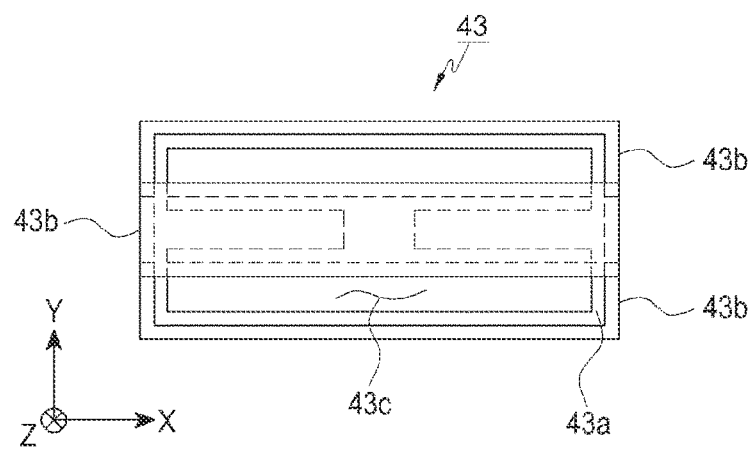
FIG. 5 is a view illustrating a part of a reception device of the wireless power transmission/reception system according to an embodiment of the present disclosure.
Figure 6:
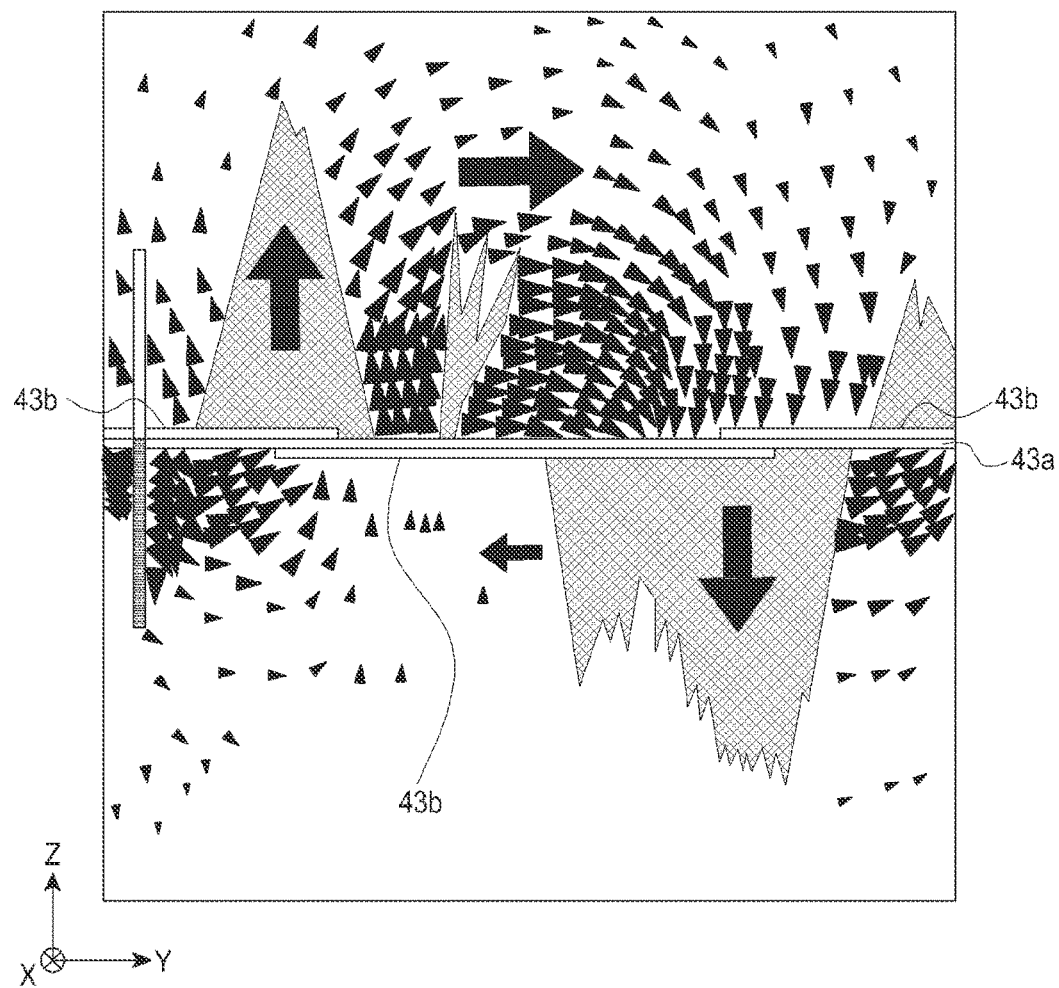
FIG. 6 is a view illustrating a magnetic field distribution formed by the reception resonator module 43 of FIG. 5 in a wireless power transmission/reception system according to an embodiment of the present disclosure.

FIG. 4 is a diagram illustrating a wireless power transmission/reception system according to another one of various embodiments of the present disclosure. FIG. 5 is a view illustrating a part of a reception device of the wireless power transmission/reception device according to another one of various embodiments of the present disclosure. FIG. 6 is a view illustrating a magnetic field distribution formed by the reception resonator module 43 of FIG. 5 in a wireless power transmission/reception system according to an embodiment of the present disclosure In FIGS. 5 and 6, two ferrite members 43b are disposed on opposite edges of one side of secondary planar resonator 43a (which itself is disposed within one of the reception units 21 in FIG. 4), and another ferrite member 43b is disposed on the central portion of the other side of secondary planar resonator 43a. Accordingly, reception side resonator module 43 is configured with three ferrite members 43b disposed on opposite sides of secondary planar resonator 43a. As shown in plan view in FIG. 6, ferrite members 43b are staggered in relation to each other and partially overlapping. As referred to above, depending on the particular embodiment in accordance with the present disclosure, the sizes, shapes, points of attachment, relative positions, and number of ferrite members may be varied in consideration of, e.g., the desired magnetic field distribution and direction to be formed using the secondary planar resonator(s).

FIG. 6 is a view illustrating a magnetic field distribution formed by the reception resonator module 43 of FIG. 5 in a wireless power transmission/reception device according to an embodiment of the present disclosure.

Referring to FIG. 6, the magnetic field distribution formed by the secondary planar resonator 43a may have a vertical vector component (e.g., vector component along Z-direction) and horizontal vector component (e.g., vector component along Y direction) with respect to the opening faces 43c. As shown in FIG. 6, a magnetic field distribution in the +z-axis direction is formed at one end of the opening face 43c (on the left in FIG. 6), and a magnetic field distribution in the −z-axis direction is formed at the other end (on the right in FIG. 6), such that the sum of the magnetic field directions may approach "0." Accordingly, the magnetic field distribution formed by the secondary planar resonator 43a is in a direction substantially parallel to the opening face 43c (as seen in the top portion of FIG. 6). The secondary planar resonator 43a as described above, for example, the planar resonator that forms a magnetic field distribution parallel to the opening face 43c, may be equipped in the reception unit 21 (e.g., the electronic device). When the reception unit 21 is cradled on a transmission unit (e.g., the transmission unit 11), the secondary planar resonator 42a may be disposed substantially in the vertical direction with respect to the primary planar resonator 13.

Figure 7:
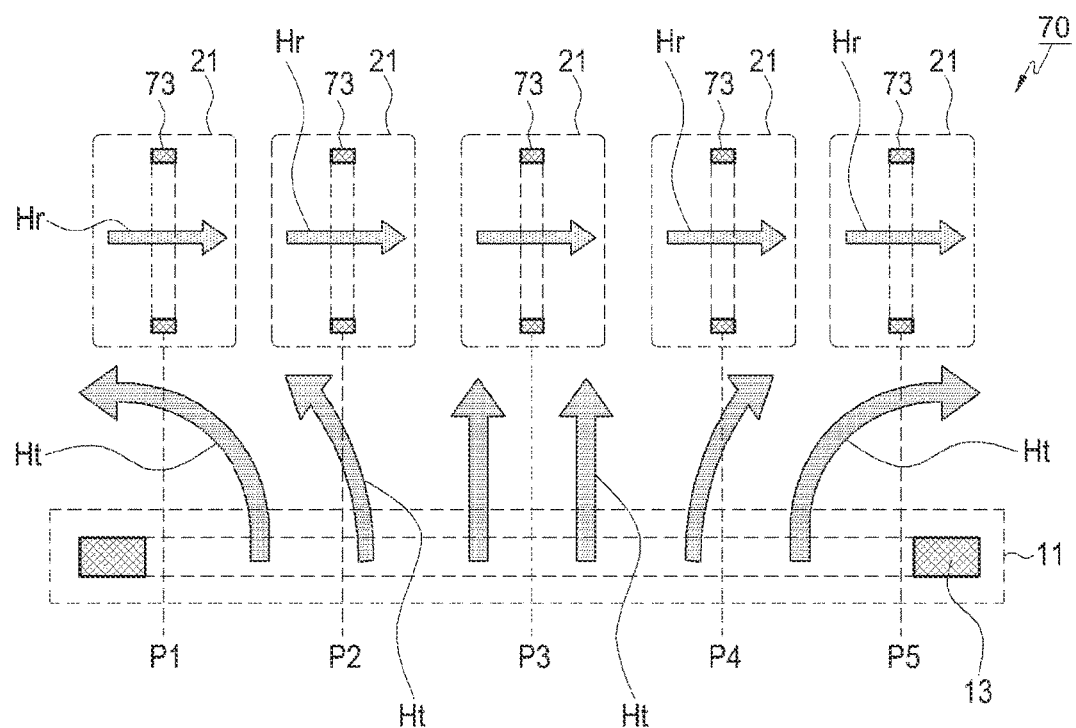
FIG. 7 is a diagram illustrating a conventional wireless power transmission/reception system.
Figure 8:
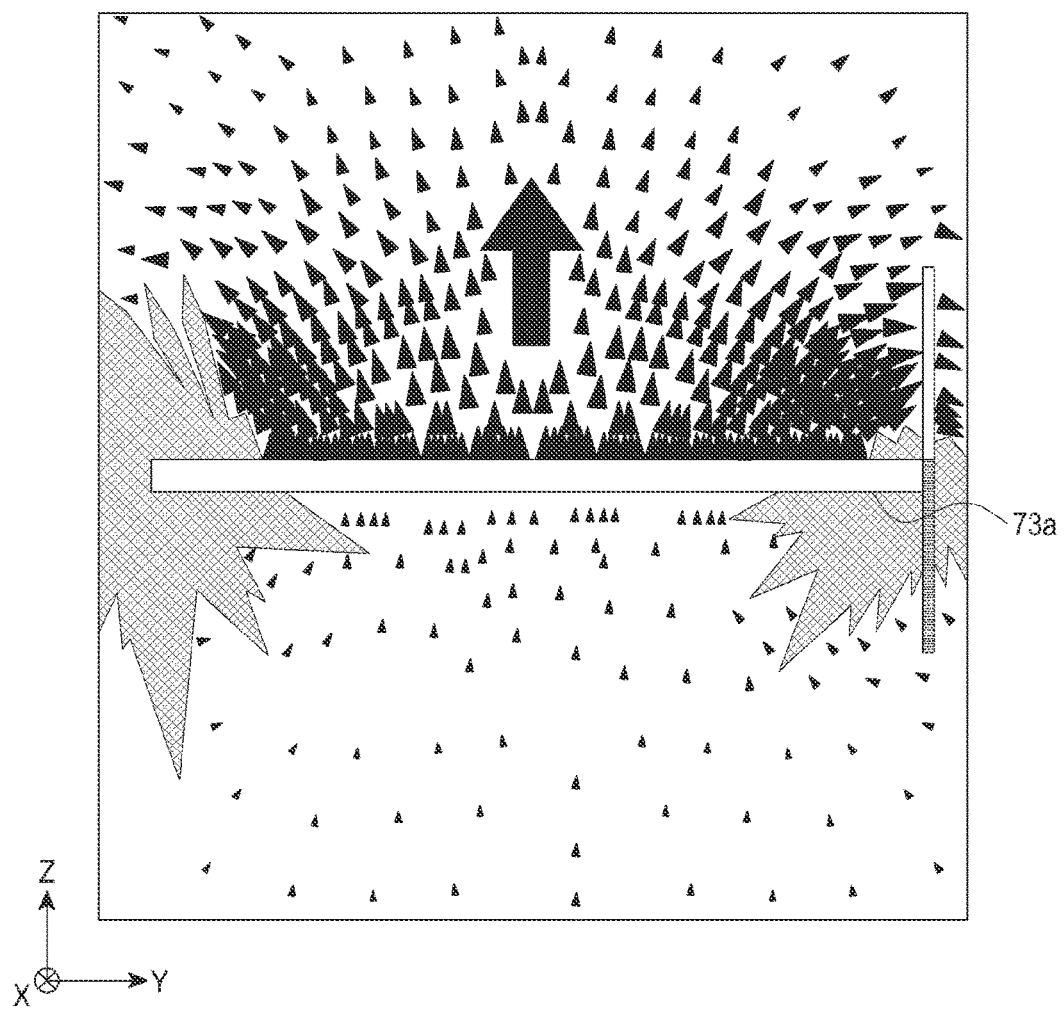
FIG. 8 is a view illustrating a magnetic field distribution formed by the reception unit 73 of the conventional wireless power transmission/reception system in FIG. 7.

FIG. 7 is a diagram illustrating a conventional wireless power transmission/reception system. FIG. 8 is a view illustrating a magnetic field distribution formed by the reception unit 73 of the conventional wireless power transmission/reception device.

As illustrated in FIGS. 7 and 8, the primary planar resonator of a conventional wireless power transmission/reception device 70 forms magnetic field distribution Ht, and secondary planar resonator(s) 73 forms magnetic field distribution Hr. When a wireless power reception device/unit 21 equipped with secondary planar resonator 73 is placed near wireless power transmission device/unit 11 for charging, the magnetic field distributions Ht and Hr of the primary and secondary planar resonators 13 and 73, respectively, are formed perpendicular to each other at the center of the transmission unit 11, and thus, the power transmission/reception efficiency may be sharply degraded. Moreover, if the user places the reception device to be charged in the center of the transmission unit, the wireless power transmission/reception efficiency will be even further degraded.

Figure 9:
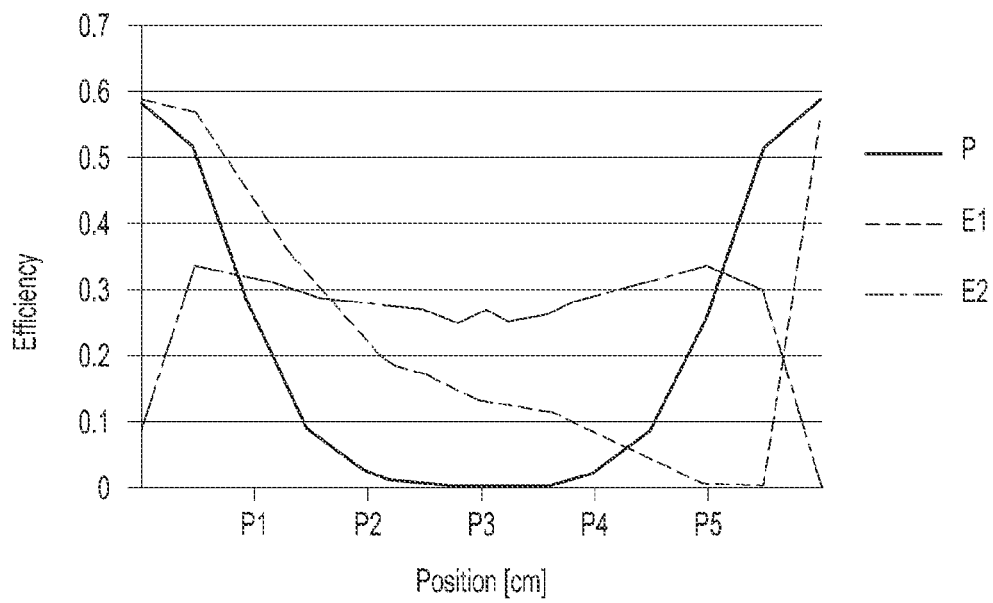
FIG. 9 is a graph representing the measured power transmission/reception efficiency of the wireless power transmission/reception systems in FIGS. 1, 4, and 7.

FIG. 9 is a graph of the measured power transmission/reception efficiency of the wireless power transmission/reception systems in FIGS. 1, 4, and 7.

In FIG. 9, "P1," "P2," "P3," "P4," and "P5" correspond to the positions designated by "P1," "P2," "P3," "P4," and "P5", respectively, in each of FIGS. 1, 4 and 7. The line designated by "P" in the legend represents the power transmission/reception efficiency of the conventional wireless power transmission/reception system 70 illustrated in FIG. 7, the line designated by "E1" in the legend represents the power transmission/reception efficiency of the wireless power transmission/reception system 10 illustrated in FIG. 1, and the line designated by "E2" in the legend represents the power transmission/reception efficiency of the wireless power transmission/reception system 40 illustrated in FIG. 4.

Referring to FIG. 9, when the plane of secondary planar resonator 73 is disposed perpendicularly to the plane of the primary planar resonator 11, i.e., at the location designated by "P3", the power transmission/reception efficiency of the conventional wireless power transmission/reception system 70 is so sharply degraded that hardly any wireless power is transmitted. This is because the magnetic field distribution directions formed by the primary and secondary planar resonators are arranged perpendicular to each other, as described above. By contrast, when the reception device/unit is placed at one of the ends of the transmission unit of the conventional system, i.e., at the locations designated by "P1" or "P5", a relatively good power transmission/reception efficiency may be secured. However, considering the fact that the location of the reception device for charging is not predetermined, and the likelihood that the user may intuitively place the reception device on the central portion of the transmission unit for charging, the difficulty in ensuring a good, stable, and/or consistent power transmission/reception efficiency in the conventional system is evident.

In FIG. 9, it can be seen that the wireless power transmission/reception efficiency of the wireless power transmission/reception systems 10 and 40 according to the embodiments of the present disclosure (indicated by the lines designated "E1" and "E2", respectively) is considerably more stable/consistent than the conventional wireless power transmission/reception system (indicated by the line designated "P"). For example, when the reception devices/units are disposed on the central portion of the transmission unit 11, i.e., at the locations P2, P3, and P4, the wireless power transmission/reception efficiency of the wireless power transmission/reception systems according to the embodiments of the present disclosure is considerably improved as compared with the conventional wireless power transmission/reception system. In addition, in FIG. 9, it can be seen that when ferrite members are disposed on the reception side (or transmission side) planar resonator so as to change the overall direction of the magnetic field distribution in relation to its opening face, as is done in systems 10 and 40 according to embodiments of the present disclosure, a relatively uniform power transmission efficiency can be secured regardless of where the reception unit is disposed on the transmission unit.

Figure 10:
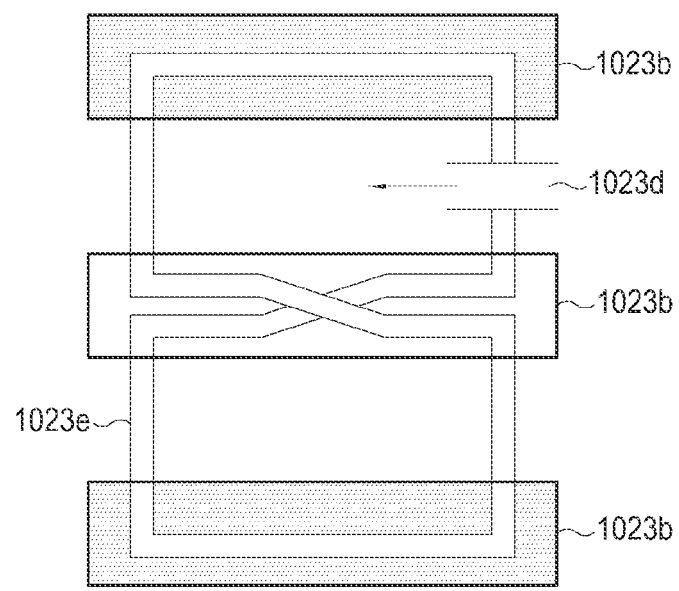
FIGS. 10 to 12 are views illustrating configurations of a planar resonator in a wireless power transmission and/or reception device according to various embodiments of the present disclosure.
Figure 11:
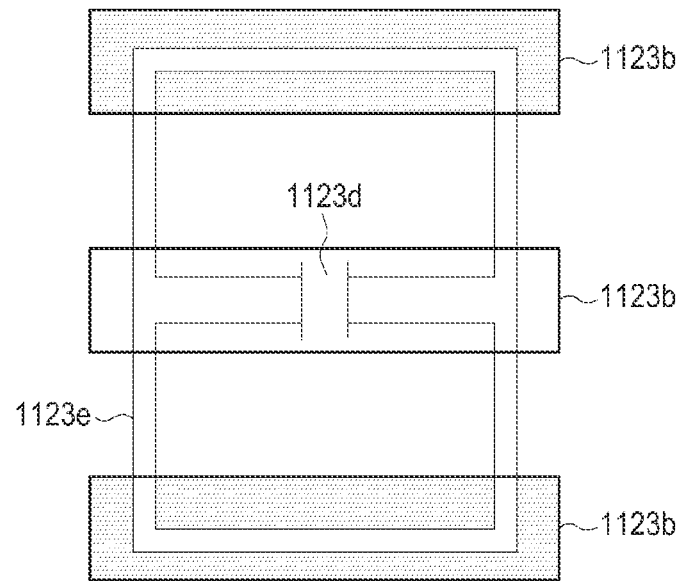
Figure 12:
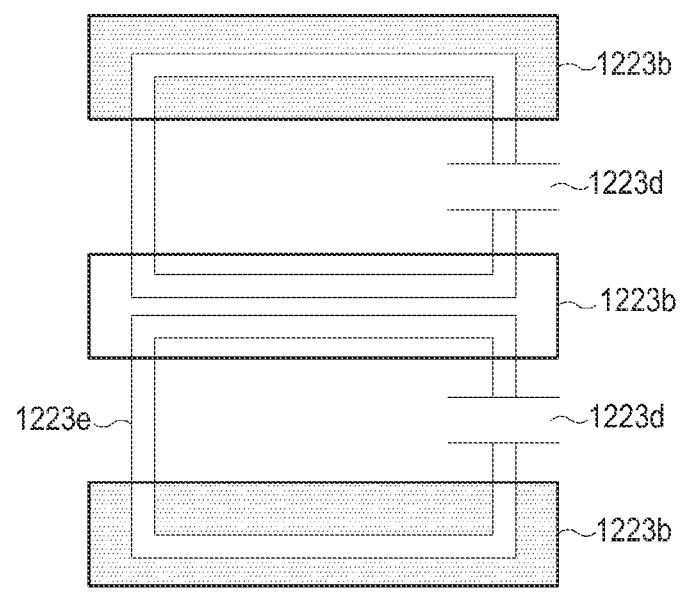

FIGS. 10 to 12 are views illustrating configurations of a planar resonator in a wireless power transmission and/or reception device according to various embodiments of the present disclosure.

As illustrated in FIGS. 10 to 12, a primary or secondary planar resonator may have any of a plurality of opening configurations in wireless power transmission/reception systems according to various embodiments of the present disclosure. For example, the planar resonator may be implemented by a plurality of loop antennas or LC resonance circuits.

FIG. 10 shows an example of a structure in which LC resonance circuits, each of which is formed by a combination of a wire 1023e having an inductive component and a capacitive element 1023d in single loop and single twisted shape. FIG. 11 shows an example of a structure in which LC resonance circuits, each of which is formed by a combination of a wire 1123e having an inductive component and a capacitive element 1123d in a pair of loops. The pair of loops may be electrically connected to each other and commonly share the inductive component and the capacitive element 1123d. FIG. 12 shows an example of a structure in which a pair of LC resonance circuits, each of which is formed by a combination of an inductive component and a capacitive element 1123d, are arranged in parallel to each other and electrically isolated from each other.

While the planar resonators described above have various configurations, the magnetic field distribution formed by the planar resonator may be formed in any desired direction by varying the shapes, sizes, and disposed positions of the ferrite members. Accordingly, by arranging the ferrite members depending on the design or shape of the electronic device equipped with a planar resonator for wireless power transmission/reception, or depending on the relative positional relationship between the wireless power transmission unit and the wireless power reception unit, a good wireless power transmission/reception efficiency can be secured according to embodiments of the present disclosure.

Figure 13:
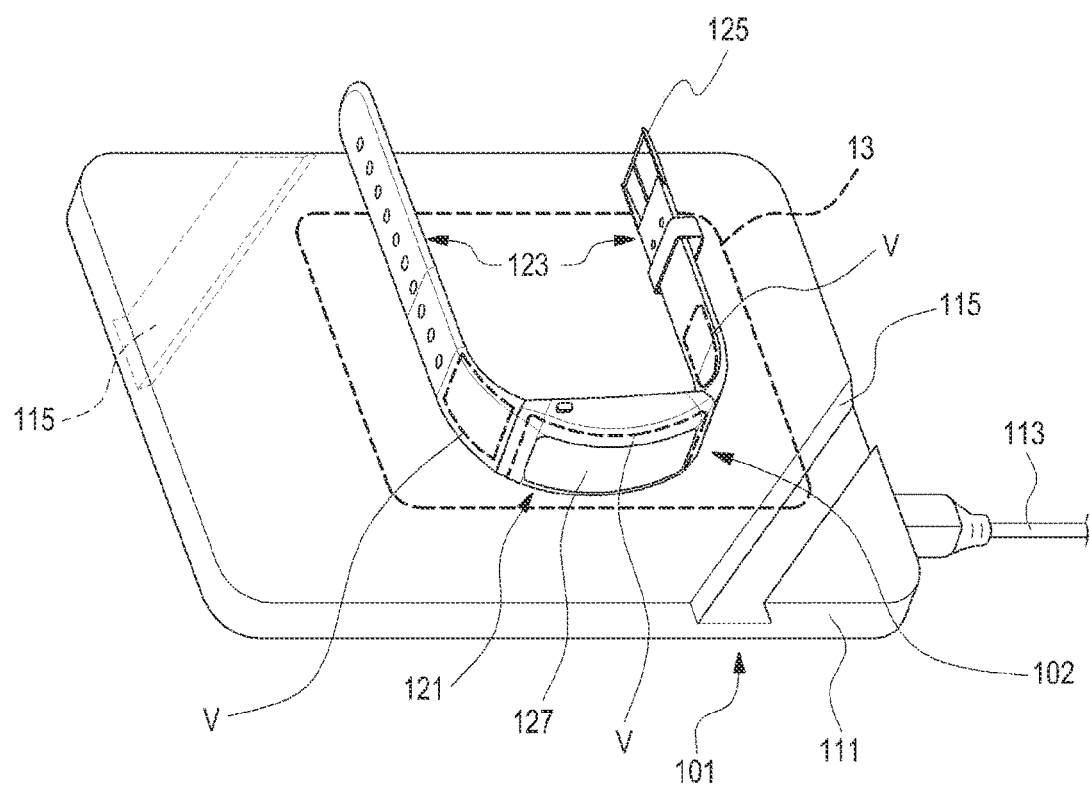
FIG. 13 is a view illustrating an example of a wireless power transmission/reception system according to an embodiment of the present disclosure.
Figure 14:
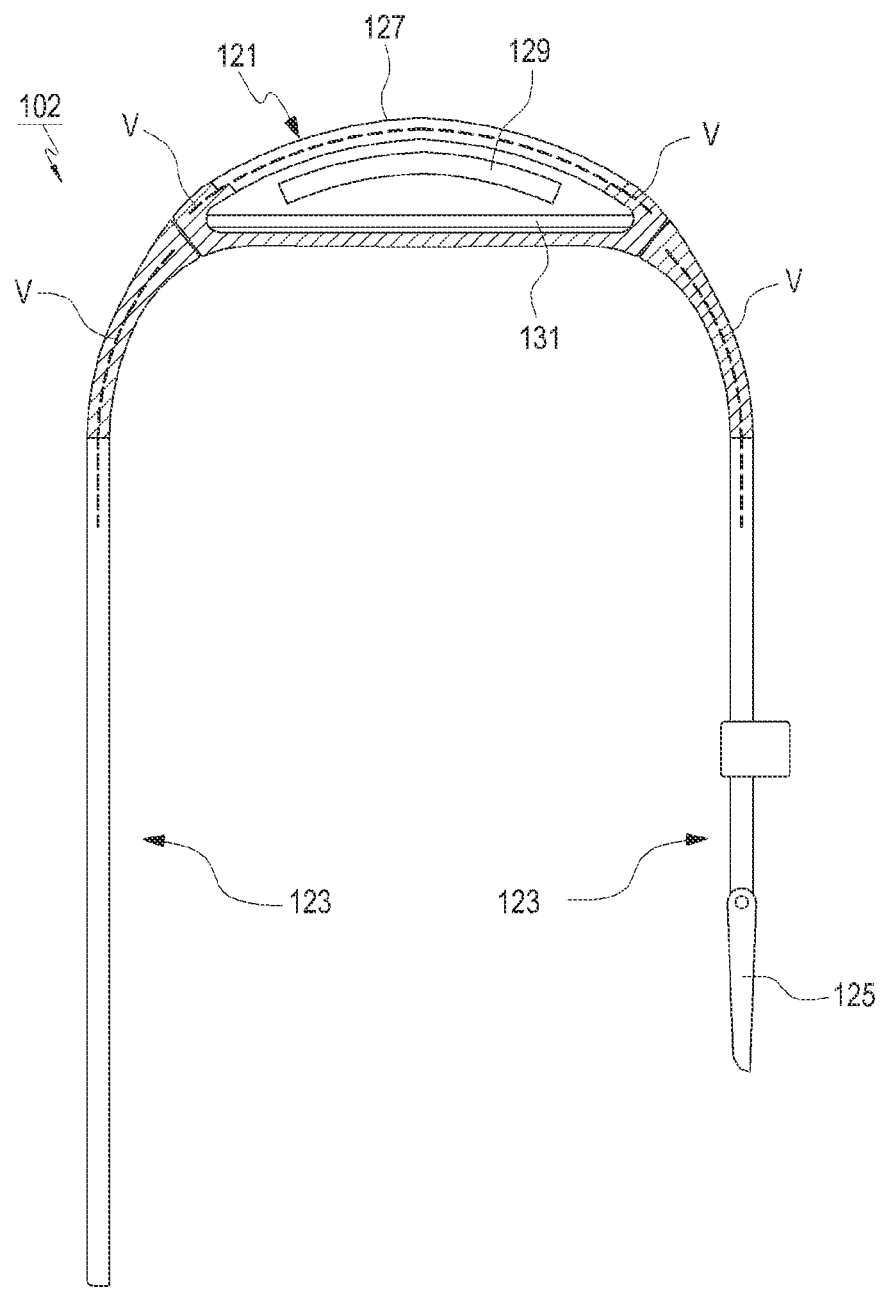
FIG. 14 is a view illustrating the portable electronic device in FIG. 13 that implements a reception unit of a wireless power transmission/reception system according to an embodiment of the present disclosure.
Figure 15:
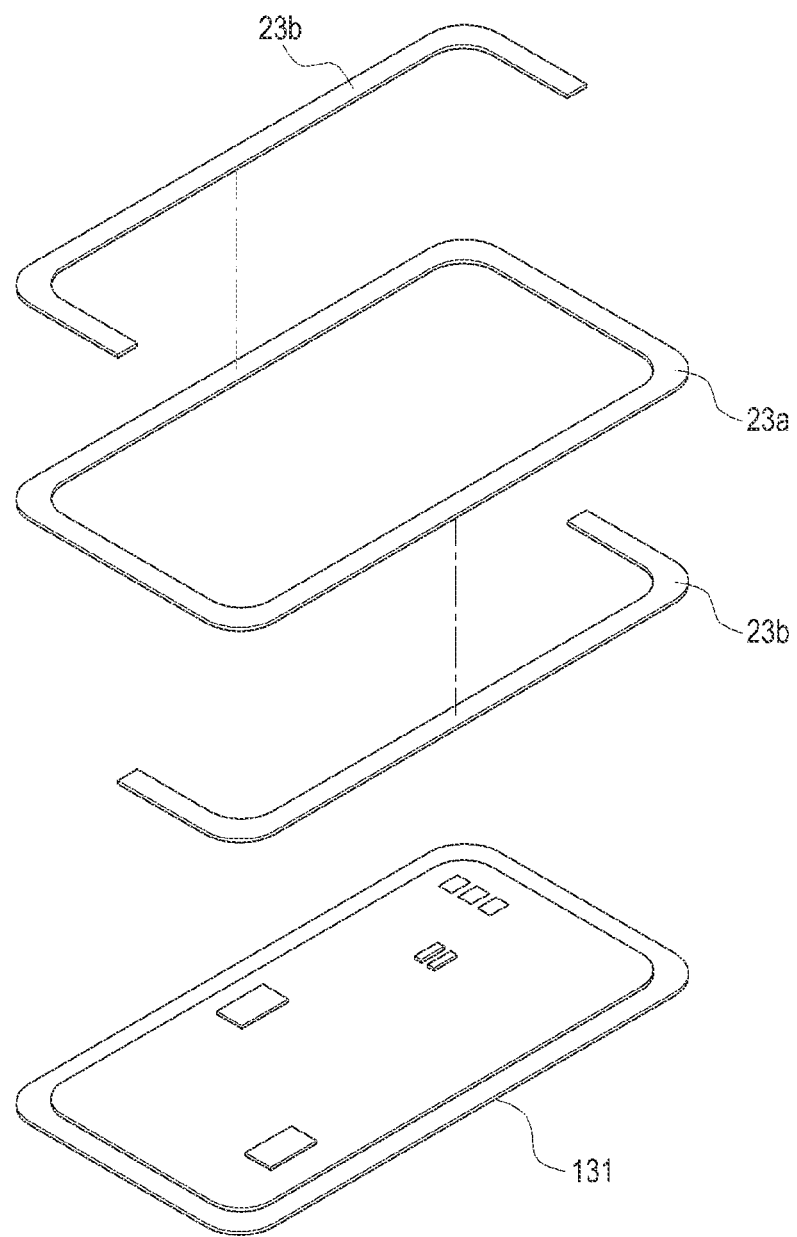
FIG. 15 is a view of an example of a structure of a secondary planar resonator mounted on circuit board 131 of FIG. 14 according to an embodiment of the present disclosure.

FIG. 13 is a view illustrating an example of a wireless power transmission/reception system according to an embodiment of the present disclosure. FIG. 14 is a view illustrating portable electronic device 102 from FIG. 13 that implements a reception unit of a wireless power transmission/reception system according to an embodiment of the present disclosure. FIG. 15 is a view of an example of a structure of a secondary planar resonator mounted on circuit board 131 of FIG. 14 according to one of various embodiments of the present disclosure.

In FIGS. 13 to 15, the wireless power transmission unit is formed as a charging cradle/pad 101 and the reception device/unit is wearable electronic device 102

Referring to FIGS. 13 to 15, the primary planar resonator 13 of the transmission unit is disposed adjacent to the inner top surface of the housing 111 of the charging cradle/pad 101. The charging cradle 101 forms magnetic fields through the aforementioned primary planar resonator 13 by receiving power through a separate cable 113. The top surface of the charging cradle 101 is mostly flat, and includes a cradle recess 115 formed at a proper position on opposite sides of cradle/pad 101. When an electronic device capable of receiving a wireless power is laid on the top surface of the charging cradle/pad 101 or mounted in the cradle recess 115, the electronic device may be supplied with the power wirelessly from the charging cradle/pad 101. The power wirelessly supplied from the charging cradle 101 is capable of charging the battery pack 129 (shown in FIG. 14) of the electronic device 102 (or an electronic device mounted in the cradle recess 115).

The electronic device 102 is a wearable (e.g., wrist-wearable) electronic device, and includes wearing bands 123 that extend from opposite lateral sides of a main body 121. The wearing bands 123 can be detachably bound to each other by a buckle 125 so as to allow the main body 121 to be worn on, for example, a wrist of the user's body. A display 127 is mounted on the front surface of the main body 121, and a circuit board 131 is disposed within the main body 121. The secondary planar resonator may be disposed on, for example, the circuit board 131, a wearing band 123, or an edge of the main body 121. In FIGS. 13 and 14, reference numeral "V" denotes examples of locations where the secondary planar resonator may be disposed. The embodiment shown in FIGS. 14 and 15 is an example of a structure in which the secondary planar resonator is disposed on the circuit board 131. As discussed above, the secondary planar resonator may have any of a number of structures, including a loop antenna structure where ferrite members are disposed on opposite surfaces of the secondary planar resonator.

As illustrated in FIG. 13, the electronic device 102 is disposed on the top surface of the charging cradle/pad 101 such that its secondary planar resonator in any of the locations V will be disposed perpendicularly in relation to the top surface of the charging cradle 101, or, equivalently, to the opening face of the primary planar resonator. When the primary and secondary resonators are arranged in such a manner in a conventional structure, the charging efficiency (e.g., the wireless power transmission/reception efficiency) may be sharply degraded. By contrast, as described above, a wireless power transmission/reception system according to embodiments of the present disclosure is capable of securing a stable/consistent power transmission efficiency by properly arranging, for example, ferrite members on the (receiving) secondary planar resonator in consideration of the relative location/orientation of the (transmitting) primary planar resonator.

Figure 16:
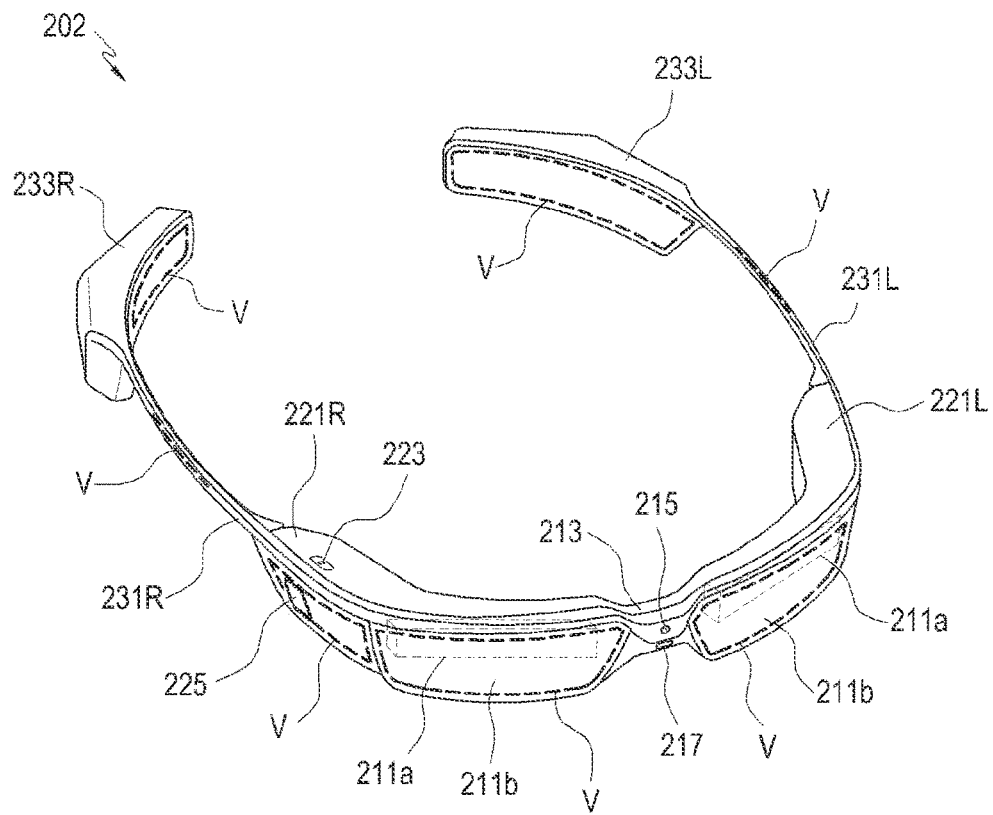
FIG. 16 is a view illustrating another portable electronic device that implements a reception unit of a wireless power transmission/reception system according to an embodiment of the present disclosure.

FIG. 16 is a view illustrating another portable electronic device that implements a reception unit of a wireless power transmission/reception system according to various embodiments of the present disclosure.

The electronic device 202 may be supplied with a charging power through charging cradle/pad 101 so as to charge a battery pack embedded therein by means of, for example, a secondary planar resonator disposed in the electronic device 202.

In FIG. 16, the electronic device 202 is implemented as a glasses/display device to be worn on the user's face. A see-through display unit therein may be positioned adjacent to the user's eyes and one or more speakers may be positioned adjacent to the user's ears so as to provide visual information and acoustic information to the user. In other embodiments, the portable electronic device may be an eyeglasses-type display device or a helmet-type display device, and may include a monocular-type display device having one display unit or a binocular-type display device having a plurality of display units. Such a binocular-type display device may output a three-dimensional image, and/or may selectively operate only one of its plurality of display units.

In FIG. 16, electronic device 202 includes two display units 211a, two optical lenses 211b, a first housing 221R within which are disposed one of the optical lenses 211b and one of the display units 211a, a second housing 221L within which are disposed the other one of the optical lenses 211b and the other one of the display units 211a, and a bridge 213 that connects the first housing 221R and the second housing 221L. Electronic device 202 further includes a housing connection section 231R that connects the first housing 221R and a third housing 233R and a housing connection section 231L that connects the second housing 221L and a fourth housing 233L. Accordingly, the electronic device 202 is configured in a bilaterally symmetric shape. One or more battery packs may be embedded in any of the first housing 221R, second housing 221L, third housing 233R, and/or fourth housing 233L.

The housing connection sections 231R and 231L may be made of an elastically flexible material, thereby allowing the electronic device 202 to be worn comfortably on the user's head.

The display units 211a may be positioned at a predetermined spaced distance (e.g., 5 cm or less) from the front surface of the optical lenses 211b or at a spaced distance (e.g., 5 cm or less) from the rear surface of the optical lenses 211b. The spaced distance between the display units 211a and the optical lenses 211b may be varied according to the purpose, performance, and/or structure of electronic device 202.

In FIG. 16, electronic device 202 includes a camera 215 and a sensor 217 in the bridge 213. In other embodiments, one or more cameras and/or one or more sensors may be positioned on at least one of the first housing 221R, second housing 221L, third housing 233R, fourth housing 233L, housing connection section 231R, and/or housing connection section 231L.

In FIG. 16, first housing 221R of the electronic device 202 includes a button 223 and a touch pad 225. In other embodiments, one or more buttons and/or one or more touch pads may be positioned on at least one of first housing 221R, second housing 221L, third housing 233R, fourth housing 233L, housing connection section 231R, and/or housing connection section 231L. Moreover, in other embodiments, the electronic device 202 may include one or more microphones and/or one or more speakers for inputting/outputting of sounds.

One or more secondary planar resonators together with one or more ferrite members may be disposed in, for example, at least one of the optical lenses 211b, the first to fourth housings 221R, 221L, 233R, and 233L, and/or the housing connection sections 231R and 231L. In FIG. 16, reference numeral "V" denotes examples of locations where one or more secondary planar resonators may be disposed. In an embodiment where a secondary planar resonator is disposed on one or both of the optical lenses 211b, it may be formed of an Indium-Tin Oxide (ITO) film including a transparent electrode or a conductive line. In embodiments where the portable electronic device includes a plurality of battery packs embedded therein, a plurality of secondary planar resonators may be provided to correspond to the battery packs.

In one or more secondary planar resonators provided together with ferrite members in the electronic device 202 in FIG. 16, magnetic fields may be generated in a tilted or vertical direction with respect to the opening face or plane of the primary planar resonator 13 when the electronic device 202 is placed/laid on the charging cradle/pad 101 of FIG. 13. For example, if a secondary planar resonator is disposed on either or both of the optical lenses 211b, the opening face of the secondary planar resonator will be positioned substantially perpendicularly with respect to the opening face or plane of the primary planar resonator 13. In accordance with the present disclosure, the electronic device 202 is fabricated with one or more secondary planar resonators and one or more ferrite members such that, when the electronic device 202 is cradled/placed on the charging cradle/pad 101, the direction of the magnetic fields generated by the secondary planar resonator(s) is tilted or arranged perpendicular in relation to the opening face of the primary planar resonator 13. Thus, regardless of the position in which electronic device 202 is placed on the charging cradle/pad 101, charging power will be stably supplied by the charging cradle/pad 101.

One or more battery packs, which may be accommodated in, for example, any one of the first to fourth housings 221R, 221L, 233R, and 233L, are connected to the one or more secondary planar resonators, and the charging power supplied by the charging cradle/pad 101 is received through the one or more secondary planar resonators so as to charge the one or more battery packs. As described above, when a plurality of battery packs are disposed in one or more housings, a plurality of secondary planar resonators may be disposed such that each of the battery packs has a corresponding secondary planar resonator.

As shown by the various examples discussed above, wearable/portable electronic devices may be placed on, for example, the flat surface of a charging cradle/pad in any arbitrary direction/orientation.

However, the directions/orientations in which portable/wearable electronic devices are placed on a flat surface depends on, inter alia, the shape, purpose, construction, etc., of each electronic device. Thus, in many cases, the direction/orientation in which a specific portable/wearable electronic device may be placed may be easily predicted. Accordingly, according to various embodiments of the present disclosure, the secondary planar resonator(s) and the ferrite members may be properly arranged in consideration of, for example, the shape, purpose, construction, etc., of the particular electronic device that is to be equipped with the wireless power transmission/reception function. For example, the shapes, sizes, orientations, and/or placements of the secondary planar resonator(s) and ferrite members may be variously changed depending on the shape and position of the housing within which the secondary planar resonator(s) is located. A stable wireless power transmission/reception efficiency is enabled by setting the substantially overall direction of the magnetic fields generated by the secondary planar resonator in accordance with embodiments of the present disclosure.

Figure 17:
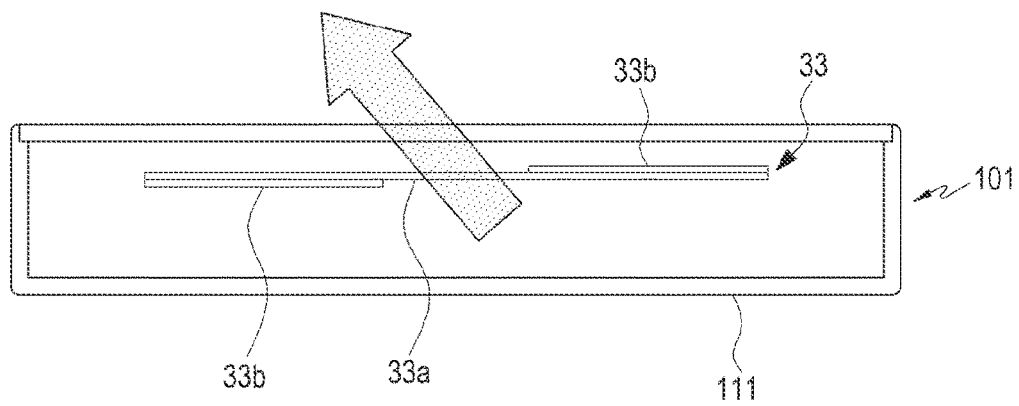
FIG. 17 is a cross-section of a wireless power transmitting charging cradle of a wireless power transmission/reception system according to various embodiments of the present disclosure.

FIG. 17 is a cross-section of a wireless power charging cradle of a wireless power transmission/reception system according to various embodiments of the present disclosure.

In FIG. 17, the wireless power transmission unit is implemented by disposing a primary resonator module 33 within the housing 111 of charging cradle 101. Since charging cradle 101 has been discussed in preceding embodiments, a detailed description of, for example, the configuration of charging cradle 101 will be omitted herein.

Primary resonator module 33 includes a primary planar resonator 33a and ferrite members 33b. The primary planar resonator 33a may be implemented as a loop antenna or an LC resonance circuit, and may include lumped elements for impedance matching. The primary resonator module 33 is disposed adjacent to the top surface of the housing 111 of charging cradle/pad 101. The opening face or plane of the primary planar resonator 33a is arranged parallel to the top surface of charging cradle/pad 101 and, when supplied with power, generates magnetic fields having an overall direction perpendicular to the top surface of the charging cradle 101.

One ferrite member 33b is attached to the top surface of the planar resonator 33a and the other ferrite member 33b is attached to the bottom surface of the planar resonator 33a. Ferrite members 33b disposed on the top and bottom surfaces of the planar resonator 33a are staggered in relation to each other, i.e., the ferrite member 33b on the top surface is positioned on the left end of planar resonator 33a and the ferrite member 33b on the bottom surface is positioned on the right end of planar resonator 33a. Because of the positioning of ferrite members 33b, the magnetic fields generated by the planar resonator 33a are distributed in a tilted direction in relation to the opening face or plane of the planar resonator 33a (or, equivalently, to the top surface of the charging cradle/pad 101). Accordingly, the resonator module 33 may generate both the magnetic field in parallel to the top surface of the charging cradle 101 and the magnetic field perpendicular to the top surface of the charging cradle 101.

The preceding embodiments have provided examples of, for example, configurations in which ferrite members are disposed on the secondary planar resonator of the wireless power reception device/unit. However, the present disclosure is not limited thereto, and as illustrated in FIG. 17, the ferrite members may be disposed on the primary planar resonator in a charging cradle/pad, i.e., in the wireless power transmission device/unit. Accordingly, the magnetic fields generated by the primary resonator module in such embodiments are distributed to be tilted in relation to the plane of the primary planar resonator, e.g., tilted in relation to the top surface of the charging cradle/pad 101.

If an electronic device (e.g., the wearable electronic device 102) corresponding to the reception unit includes the secondary planar resonator, the electronic device may be cradled on the top surface of the charging cradle 101 to be supplied with power wirelessly from the charging cradle 101. The secondary planar resonator may be resonated by the magnetic fields generated by the primary planar resonator, thereby the secondary planar resonator may generate an induced current. The electronic device may be operated by the induced current generated by the secondary planar resonator and/or the electronic device may be operated by the battery pack embedded therein, which may be charged by the charging cradle.

When the electronic device is cradled in the state where the opening face of the secondary planar resonator is parallel to the top surface of the charging cradle 101, the second planar resonator may be resonated by the magnetic fields generated by the primary planar resonator in the direction perpendicular to the top surface of the charging cradle 101 and may generate an induced current. When the electronic device is cradled in the state where the opening face of the secondary planar resonator is perpendicular to the top surface of the charging cradle 101, the second planar resonator may be resonated by the magnetic fields generated by the primary planar resonator in the direction horizontal (or parallel) to the top surface of the charging cradle 101 and may generate an induced current. As described above, according to various embodiments, the wireless power transmission/reception device may cause the magnetic field distribution of the resonator module disposed at the transmission unit side to be tilted in relation to the surface where the reception unit is cradled (e.g., the top surface of the charging cradle 101). Through this, it is possible to wirelessly supply and transmit power to various types of electronic devices provided with the secondary planar resonator.

According to various embodiments, the ferrite members are properly arranged in the planar resonator in consideration of, for example, the cradled direction in designing and fabricating the charging cradle serving as the transmit unit and the electronic device serving as the reception unit, a good wireless power transmission/reception efficiency can be secured. For example, no matter what direction/orientation the reception unit has in the charging cradle, the secondary planar resonator disposed in the reception unit will be resonated by the magnetic fields generated by the primary resonator in the direction perpendicular and/or horizontal to the top surface of the charging cradle.

While the present disclosure has been shown and described with reference to certain embodiments thereof, it will be understood by those of ordinary skill in the art that various changes in form and details may be made therein without departing from the spirit and scope of the present disclosure as defined by the appended claims.

What is claimed is:

1. A wireless power reception device comprising:
   a planar resonator configured to be coupled with external magnetic fields and generate an induced current;
   a first ferrite member mounted on a first side of the planar resonator and positioned in a lower portion of the planar resonator; and
   a second ferrite member mounted on a second side of the planar resonator opposite to the first side and positioned in an upper portion of the planar resonator,
   wherein the external magnetic fields pass through an aperture of the planar resonator substantially from one of the first side of the lower portion of the planar resonator and the second side of the upper portion of the planar resonator to the other of the first side of the lower portion of the planar resonator and the second side of the upper portion of the planar resonator.

2. The wireless power reception device of claim 1, wherein the first ferrite member and the second ferrite member are staggered in relation to each other on the planar resonator.

3. A wireless power reception device comprising:
   a planar resonator configured to be coupled with external magnetic fields and generate an induced current;
   a first ferrite member disposed adjacent to one end of an upper portion of the planar resonator;
   a second ferrite member disposed adjacent to the opposite end of the upper portion of the planar resonator; and
   a third ferrite member mounted on a central region of the planar resonator and positioned in a lower portion of the planar resonator,
   wherein the external magnetic fields pass through an aperture of the planar resonator substantially from the one end and the opposite end of the upper portion of the planar resonator to the central region of the lower portion of the planar resonator, or substantially from the central region of the lower portion of the planar resonator to the one end and the opposite end of the upper portion of the planar resonator.

4. The wireless power reception device of claim 1, wherein the planar resonator comprises at least one of a loop antenna and an LC resonance circuit.

5. The wireless power reception device of claim 1, wherein the planar resonator is one of a plurality of planar resonators which are arranged in series or parallel to each other.

6. The wireless power reception device of claim 1, wherein the wireless power reception device comprises a portable electronic device.

7. The wireless power reception device of claim 1, further comprising:
   a battery pack,
   wherein the planar resonator supplies charging power to the battery pack.

8. The wireless power reception device of claim 1, wherein the wireless power reception device is a wearable electronic device including a main body, a circuit board within the main body, and a wearing band extending from the main body, and
   wherein the planar resonator is provided on any one of the circuit board, an edge of the main body, and the wearing band.

9. The wireless power reception device of claim 1, wherein the wireless power reception device is a wearable display device including a display, an optical lens, and at least one housing that accommodates a battery pack, and
   wherein the planar resonator is disposed on any one of the optical lens and the housing.

10. A wireless power reception device comprising:
    a planar resonator comprising an aperture formed through from a lower portion of the planar resonator to an upper portion of the planar resonator, and configured to generate magnetic fields and an induced current when being resonated by external magnetic fields; and
    one or more ferrite members mounted on the planar resonator such that the magnetic fields generated by the planar resonator have an overall direction substantially tilted or parallel to the aperture,
    wherein the wireless power reception device is a wearable display device which includes:
      a pair of optical lenses;
      a first housing that accommodates one of the optical lenses;
      a second housing that accommodates the other of the optical lenses;
      a third housing connected to the first housing via a first housing connection; and
      a fourth housing connected to the second housing via a second housing connection,
    wherein at least one of the first, second, third, and fourth housings has a battery pack embedded therein, and
    wherein the planar resonator is disposed in at least one of the first, second, third, and fourth housings, the first and second housing connections, and the optical lenses.

11. The wireless power reception device of claim 10, wherein the first and second housings are connected via a bridge.

12. The wireless power reception device of claim 1, wherein the planar resonator is one of a plurality of planar resonators, the device further comprising:
    a plurality of battery packs,
    wherein the plurality of planar resonators are arranged so that each planar resonator corresponds to one of the plurality of battery packs.

13. A wireless power transmission device comprising:
    a planar configured to be coupled with external magnetic fields and generate an induced current;
    a first ferrite member mounted on a first side of the planar resonator and positioned in a lower portion of the planar resonator; and
    a second ferrite member mounted on a second side of the planar resonator opposite to the first side and positioned in an upper portion of the planar resonator,
    wherein the external magnetic fields pass through an aperture of the planar resonator substantially from one of the first side of the lower portion of the planar resonator and the second side of the upper portion of the planar resonator to the other of the first side of the lower portion of the planar resonator and the second side of the upper portion of the planar resonator.

14. The wireless power transmission device of claim 13, wherein the first ferrite member and the second ferrite member are staggered in relation to each other on the planar resonator.

15. A wireless power transmission device comprising:
    a planar resonator configured to be coupled with external magnetic fields and generate an induced current;
    a first ferrite member disposed adjacent to one end of an upper portion of the planar resonator;
    a second ferrite member disposed adjacent to the opposite end of the upper portion of the planar resonator; and
    a third ferrite member disposed on a central region of a lower portion of the planar resonator opposite to the upper portion of the planar resonator,
    wherein the external magnetic fields pass through an aperture of the planar resonator substantially from the one end and the opposite end of the upper portion of the planar resonator to the central region of the lower portion of the planar resonator, or substantially from the central region of the lower portion of the planar resonator to the one end and the opposite end of the upper portion of the planar resonator.

16. The wireless power transmission device of claim 13, wherein the planar resonator comprises at least one of a loop antenna and an LC resonance circuit.

17. The wireless power transmission device of claim 13, wherein the planar resonator is one of a plurality of planar resonators which are arranged in series or parallel to each other.

18. The wireless power transmission device of claim 13, wherein the planar resonator comprises primary planar resonator,
    wherein the primary planar resonator and a secondary planar resonator of a portable electronic device are capable of forming an electromagnetic field coupling by which the primary planar resonator induces a current in the secondary planar resonator through its generated magnetic fields.

19. The wireless power transmission device of claim 18, wherein the wireless power transmission device comprises a charging cradle and the portable electronic device is placed on or near the charging cradle to be supplied with a charging power.

20. The wireless power transmission device of claim 19, wherein the portable electronic device includes a battery pack, and the supplied charging power is used to charge the battery pack.

21. The wireless power transmission device of claim 18, further comprising:
    a surface where the portable electronic device may be removably placed on or near to form the electromagnetic field coupling of the primary and secondary planar resonators.

22. The wireless power transmission device of claim 21, wherein a plurality of portable electronic devices may be removably placed on or near the surface in order to form electromagnetic field coupling of the primary planar resonator and the secondary planar resonators of the plurality of portable electronic devices at the same time.

* * * * *